(12) United States Patent
Olofsson et al.

(10) Patent No.: US 7,023,907 B1
(45) Date of Patent: Apr. 4, 2006

(54) VDSL MODEM DIVIDED INTO A DIGITAL AND AN ANALOG PART

(75) Inventors: Sven-Rune Olofsson, Lulea (SE); Joachim Johansson, Lulea (SE); Mikael Isaksson, Lulea (SE); Hans Ohman, Lulea (SE); Daniel Bengtsson, Lulea (SE); Lennart Olsson, Lulea (SE); Anders Isaksson, Lulea (SE); Goran Okvist, Lulea (SE); Lis-Mari Ljunggren, Lulea (SE); Hans Lungberg, Lulea (SE); Tomas Stefansson, Boden (SE); Gunnar Bahlenberg, Lulea (SE); Siwert Hakansson, Jarfalla (SE); Magnus Johansson, Lulea (SE)

(73) Assignee: STMicroelectronics N.V., Amsterdam (NL)

( * ) Notice: Subject to any disclaimer, the term of this patent is extended or adjusted under 35 U.S.C. 154(b) by 0 days.

(21) Appl. No.: 09/446,357

(22) PCT Filed: Jun. 10, 1998

(86) PCT No.: PCT/SE98/01114

§ 371 (c)(1),
(2), (4) Date: Mar. 9, 2000

(87) PCT Pub. No.: WO98/58489

PCT Pub. Date: Dec. 23, 1998

(30) Foreign Application Priority Data

Jun. 18, 1997 (SE) ..................................... 9702316

(51) Int. Cl.
*H04B 1/38* (2006.01)

(52) U.S. Cl. ..................................... 375/222

(58) Field of Classification Search ................ 375/219, 375/220, 222, 257; 709/217; 455/4.2, 5.1, 455/6.1
See application file for complete search history.

(56) References Cited

U.S. PATENT DOCUMENTS

| | | | |
|---|---|---|---|
| 4,310,721 A | 1/1982 | Manley et al. | |
| 4,799,214 A | 1/1989 | Kaku | |
| 5,008,901 A | 4/1991 | Wallach et al. | |
| 5,369,687 A | 11/1994 | Farkas | |
| 5,483,592 A * | 1/1996 | Ishioka et al. | 379/373.01 |
| 5,615,036 A * | 3/1997 | Emura | 398/76 |
| 5,615,246 A * | 3/1997 | Beveridge | 379/56.2 |
| 5,623,321 A * | 4/1997 | Harsanyi | 348/730 |
| 5,655,010 A | 8/1997 | Bingel | |
| 5,680,391 A * | 10/1997 | Barron et al. | 370/241 |
| 5,706,112 A * | 1/1998 | Morita et al. | 398/162 |
| 5,801,818 A * | 9/1998 | Corrigan et al. | 356/5.01 |
| 5,809,220 A * | 9/1998 | Morrison et al. | 714/12 |

(Continued)

*Primary Examiner*—Emmanuel Bayard
(74) *Attorney, Agent, or Firm*—Lisa K. Jorgenson; Allen, Dyer, Doppelt, Milbrath & Gilchrist, P.A.

(57) ABSTRACT

A VDSL-modem which is divided into an analog part which is placed in an optical node and a digital part which is placed in a local station. The analog part of the VDSL-modem includes an A/D-converter and D/A-converter, a filter, an amplifier, a hybrid/balun, an adaptive noise attenuator, an optical interface, and possibly an echo canceller. The digital part of the modem includes an FFT/IFFT-processor, a synchronizer, an equalizer, an interleaving unit, an error correction unit, a protocol manager, and an optical interface. The VDSL-modem simplifies synchronization of the modem and reduces power consumption in the optical node. A multiplexor function in the optical node in addition is simpler because it need not manage a protocol.

11 Claims, 1 Drawing Sheet

U.S. PATENT DOCUMENTS

| | | | |
|---|---|---|---|
| 5,852,651 A * | 12/1998 | Fischer et al. | 379/56.2 |
| 5,878,325 A * | 3/1999 | Dail | 725/125 |
| 5,937,033 A * | 8/1999 | Bellows | 379/29.01 |
| 6,069,949 A * | 5/2000 | Schuenhoff et al. | 379/242 |
| 6,208,637 B1 * | 3/2001 | Eames | 370/352 |
| 6,253,235 B1 * | 6/2001 | Estes | 709/217 |
| 6,307,868 B1 * | 10/2001 | Rakib et al. | 370/485 |
| 6,324,391 B1 * | 11/2001 | Bodell | 455/403 |
| 6,408,033 B1 * | 6/2002 | Chow et al. | 375/260 |
| 6,538,781 B1 * | 3/2003 | Beierle et al. | 398/79 |
| 6,552,832 B1 * | 4/2003 | Beierle et al. | 370/478 |
| 6,753,901 B1 * | 6/2004 | Takahashi et al. | 348/65 |

* cited by examiner

VDSL MODEM DIVIDED INTO A DIGITAL AND AN ANALOG PART

This application is a 371 of PCT/Se98/01114 filed on Jun. 10, 1998.

BACKGROUND OF THE INVENTION

1. Field of the Invention

The present invention relates to a VDSL-modem.

2. Discussion of the Background

One of possible technologies for FTTN (Fibre to the Neighbourhood) is VDSL (Very High Data Rate Digital Subscriber Line). In simple terms VDSL transfers high data rates over short distances in copper cable in the Public Switched Telephone Network with a rate which depends on the current length of the copper cable. The maximum downlink rate varies between 51 and 55 Mbit/s over copper cable with a lenght of up to 300 m. The downlink rate is about 13 Mbit/s over a copper cable with a length of about 1500 m. The uplink rate in the previous VDSL-models was asymmetric just as ADSL, but with a rate of about 1,6–2,3 Mbit/s. Both data channels are separated in frequency from the channel bands which are used in POTS and ISDN, which makes possible for service suppliers to superimpose VDSL on existing services. At present also the two high speed channels for uplink respective downlink are separated in frequency. When the need increases for higher rates in the uplink channel, or symmetric rates, the VDSL-systems need to use echo cancelling. In order to correct errors which occur due to noise, VDSL utilizes for instance Forward Error Correction (FEC) with sufficient interleaving for correction of all errors.

At use of VDSL-modems for providing broadband services the lenght of the last copper line up to the subscriber is a limiting factor. This distance must be made as short as possible. FIG. 1 shows how a VDSL-modem according to the prior art is arranged in a node between a subscriber and a local station (exchange; X). The distance from the node with the VDSL-modem to the subscriber is about 300 m, at which the transmission rate may be about 50 Mbit/s in the downlink. The transmission between the node and the exchange (X) is made by means of fibre. As has been mentioned above, it is important to keep the distance between the node and the subscriber as short as possible. One way of effecting this is to extend the network with special optical nodes (ONU), as can be seen in FIG. 1, between the local station (exchange) and the subscriber. The optical fibre network consequently shall reach all these nodes, and the location is selected with intention to minimize the lenghts of the copper line. According to FIG. 1 one so far has placed the whole VDSL-modem in these nodes and made these communicate with local station (the exchange).

One problem by arranging the whole VDSL-modem in the optical node is that one will have problems with the synchronization of different VDSL-modems. The synchronization between these modems is of greatest importance, for instance for the duplex method which is utilized in Telia's patent application 9502775-1, which by this is included by reference.

Another problem is that the multiplexor function in the optical node is complicated and must be able to handle different protocols such as ATM, IP etc.

The aim with the present invention consequently is to solve these problems and reduce the complexity in the optical nodes.

SUMMARY OF THE INVENTION

This aim is reached by a VDSL-modem, at which the VDSL-modem is divided into on one hand an analog part which is located in the optical node, and on the other a digital part which is located in the local station (the exchange).

Besides this solving above mentioned problem, the power consumption in the optical node will be considerably lower.

Further characteristics are given in the subclaims.

DESCRIPTION OF THE PREFERRED EMBODIMENTS

Figure 1:
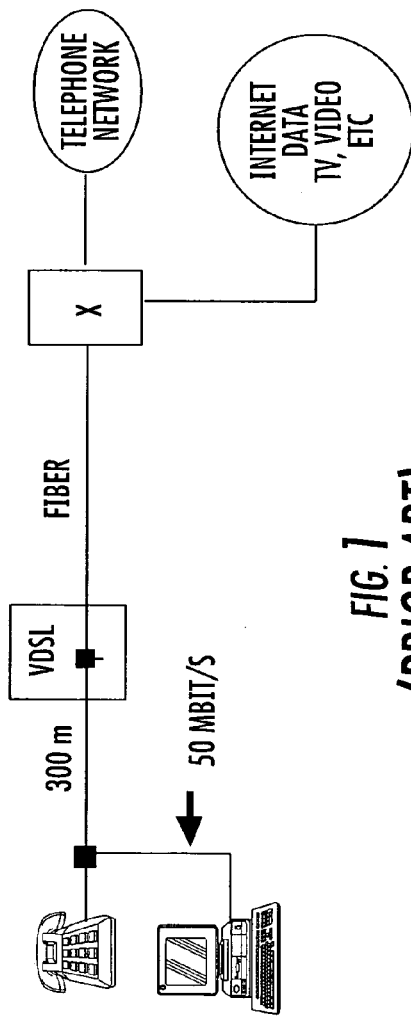
FIG. 1 is a schematic diagram illustrating a VDSL-modem according to the prior art.
Figure 2:
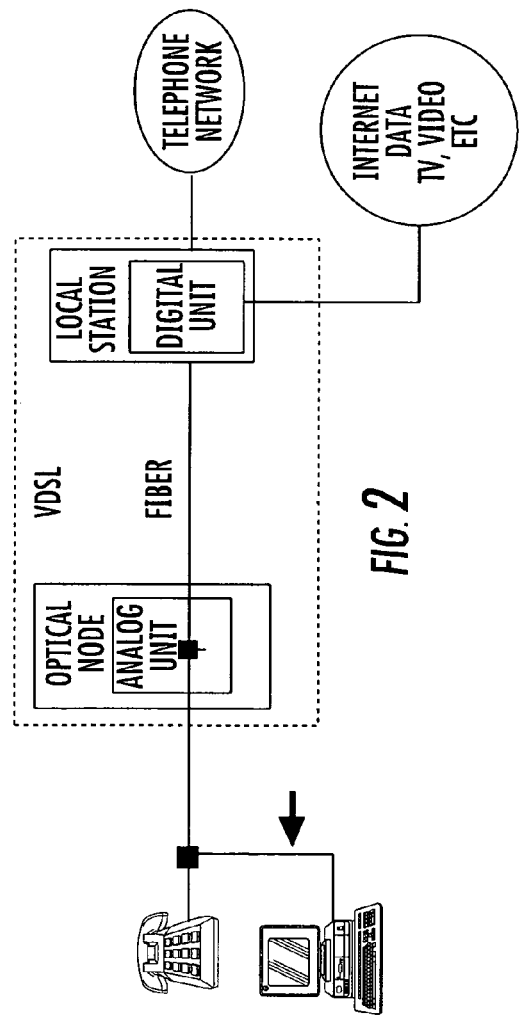
FIG. 2 is a schematic diagram illustrating a VDSL-modem according to the present invention.

As an element in reducing the complexity in the optical nodes is in this invention suggested that the VDSL-modems be divided into analog and digital parts. The analog parts are placed in the optical nodes, whereas the digital parts are placed in the local station. The communication between these parts is made via the optical fibre in form of digitized samples of the analog signal which are transmitted on the copper line.

The analog part of the VDSL-modem consists of A/D- and D/A-converter, filter, amplifier, hybride/balun, adaptive noise attenuator, optical interface, and possibly echo canceller.

The digital part of the modem consists of FFT/IFFT-processors, synchronizers, equalizers, interleaving and error correction, protocol managers and optical interface.

Since all advanced technology such as protocol manager etc is in the digital part at the station, the complexity is reduced in the optical node. By providing optical fibre interfaces is consequently made possible that the analog and digital parts of a VDSL-modem can be placed in different places, for instance in the node and at the station.

The invention is only restricted by what is indicated in the following patent claims.

The invention claimed is:

1. A VDSL-modem comprising:
    an optical node for connection to at least one subscriber, and including an analog unit comprising an analog-to-digital (A/D) converter for converting analog signals received from the at least one subscriber to digital signals for transmission;
    at least one local station, at a separate location from the optical node, and including a digital unit in communication with the analog unit for receiving the digital signals therefrom; and
    an optical fiber connecting the analog unit and the digital unit.

2. A VDSL-modem according to claim 1, wherein the digital unit includes a protocol manager.

3. A VDSL-modem according to claim 1, wherein the analog unit further includes a D/A converter, a filter, an amplifier, a hybrid/balun, an adaptive noise attenuator, and an optical interface.

4. A VDSL-modem according to claim 3, wherein the analog unit further comprises an echo canceller.

5. A VDSL-modem according to claim 1, wherein the digital unit comprises an FFT/IFFT-processor, a synchronizer, an equalizer, an interleaving device, an error correction unit, a protocol manager and an optical interface.

6. A DSL-modem comprising:
   an optical node for connection to at least one subscriber, and including an analog unit comprising an analog-to-digital (A/D) converter for converting analog signals received from the at least one subscriber to digital signals for transmission; and
   at least one local station, at a separate location from the optical node, and including a digital unit in communication with the analog unit for receiving the digital signals therefrom.

7. A VDSL-modem according to claim 6, wherein the digital unit includes a protocol manager.

8. A VDSL-modem according to claim 6, wherein the analog unit further includes a D/A converter, a filter, an amplifier, a hybrid/balun, an adaptive noise attenuator, and an optical interface.

9. A VDSL-modem according to claim 8, wherein the analog unit further comprises an echo canceller.

10. A VDSL-modem according to claim 6, wherein the digital unit comprises an FFT/IFFT-processor, a synchronizer, an equalizer, an interleaving device, an error correction unit, a protocol manager and an optical interface.

11. A method of providing a Very High Data Rate Digital Subscriber Line (VDSL) to a subscriber comprising:
   connecting an optical node to the subscriber, the optical node including an analog unit comprising an analog-to-digital (A/D) converter for converting analog signals received from the subscriber to digital signals for transmission;
   providing a digital unit in at least one local station at a separate location from the optical node, the digital unit in communication with the analog unit for receiving the digital signals therefrom; and
   connecting the analog unit and the digital unit with an optical fiber.

\* \* \* \* \*